(12) United States Patent
Soo et al.

(10) Patent No.: US 9,110,574 B2
(45) Date of Patent: *Aug. 18, 2015

(54) AUGMENTED I/O FOR LIMITED FORM FACTOR USER-INTERFACES

(71) Applicant: AT&T Intellectual Property I, L.P., Atlanta, GA (US)

(72) Inventors: Armstrong Soo, San Ramon, CA (US); Jeffrey Brandt, Cedar Park, TX (US); Bernard Ku, Austin, TX (US)

(73) Assignee: AT&T INTELLECTUAL PROPERTY I, L.P., Atlanta, GA (US)

(*) Notice: Subject to any disclaimer, the term of this patent is extended or adjusted under 35 U.S.C. 154(b) by 0 days.

This patent is subject to a terminal disclaimer.

(21) Appl. No.: 14/197,125

(22) Filed: Mar. 4, 2014

(65) Prior Publication Data

US 2014/0189556 A1    Jul. 3, 2014

Related U.S. Application Data

(63) Continuation of application No. 13/543,479, filed on Jul. 6, 2012, now Pat. No. 8,704,791, which is a continuation of application No. 12/249,064, filed on Oct. 10, 2008, now Pat. No. 8,237,666.

(51) Int. Cl.
G06F 3/0484 (2013.01)
G06F 3/041 (2006.01)
G06F 3/0488 (2013.01)

(52) U.S. Cl.
CPC .......... *G06F 3/04842* (2013.01); *G06F 3/0416* (2013.01); *G06F 3/0488* (2013.01); *G06F 3/04883* (2013.01); *G06F 2203/04805* (2013.01)

(58) Field of Classification Search
CPC . G06F 3/04842; G06F 3/0416; G06F 3/0488; G06F 3/04883; G06F 2203/04805
USPC ................................ 345/173–178, 660–671; 178/18.01–19.04; 715/700, 863, 864
See application file for complete search history.

(56) References Cited

U.S. PATENT DOCUMENTS

| 6,073,036 | A  | 6/2000 | Heikkinen et al. |
| 7,006,080 | B2 | 2/2006 | Gettemy et al. |
| 7,760,187 | B2 | 7/2010 | Kennedy et al. |
| 7,783,983 | B1 | 8/2010 | Mayers et al. |

(Continued)

OTHER PUBLICATIONS

Office Action dated Jun. 3, 2011 for PCT Application No. 12/249,064, 20 pages.

(Continued)

*Primary Examiner* — Dmitriy Bolotin
(74) *Attorney, Agent, or Firm* — Amin, Turocy & Watson, LLP

(57) ABSTRACT

The claimed subject matter relates to an architecture that can enhance and/or simplify tactile-based I/O transactions in connection with a user-interface (UI) of limited form factor. In particular, the architecture can monitor a position of a selector object such as an operator's finger relative to a UI display as the selector object hovers or moves above the UI display. Based upon this position, an analogous coordinate in the UI display can be determined, and a portion of the UI display substantially centered at the coordinate can be modified. As one example, the UI display can be modified to increase the magnification scale (e.g., a virtual magnifying glass) of the portion of the display indicated by the selector object.

20 Claims, 11 Drawing Sheets

(56) References Cited

U.S. PATENT DOCUMENTS

| | | |
|---|---|---|
| 7,786,980 B2 | 8/2010 | Lashina et al. |
| 7,884,809 B2 | 2/2011 | Fabre et al. |
| 7,890,257 B2 | 2/2011 | Fyke et al. |
| 8,704,791 B2 * | 4/2014 | Soo et al. ............ 345/173 |
| 2001/0030642 A1 * | 10/2001 | Sullivan et al. .......... 345/157 |
| 2002/0152255 A1 * | 10/2002 | Smith et al. ............ 709/102 |
| 2006/0022955 A1 | 2/2006 | Kennedy et al. |
| 2006/0132460 A1 * | 6/2006 | Kolmykov-Zotov et al. . 345/173 |
| 2006/0161870 A1 | 7/2006 | Hotelling et al. |
| 2006/0161871 A1 | 7/2006 | Hotelling et al. |
| 2006/0265653 A1 * | 11/2006 | Paasonen et al. ............ 715/704 |
| 2008/0077871 A1 | 3/2008 | Baar et al. |
| 2008/0088599 A1 * | 4/2008 | Gunn et al. ............ 345/173 |
| 2008/0106517 A1 | 5/2008 | Kerr et al. |
| 2008/0198138 A1 | 8/2008 | McFarlane et al. |
| 2008/0288895 A1 | 11/2008 | Hollemans et al. |
| 2009/0021492 A1 | 1/2009 | Wu et al. |
| 2009/0027418 A1 * | 1/2009 | Maru et al. ............ 345/629 |
| 2009/0172606 A1 | 7/2009 | Dunn et al. |
| 2009/0213084 A1 | 8/2009 | Kramer et al. |
| 2009/0225040 A1 | 9/2009 | Whytock |
| 2009/0237361 A1 * | 9/2009 | Mosby et al. ............ 345/173 |
| 2009/0251422 A1 * | 10/2009 | Wu et al. ............ 345/173 |
| 2009/0276734 A1 | 11/2009 | Taylor et al. |
| 2010/0001978 A1 | 1/2010 | Lynch et al. |
| 2010/0026723 A1 | 2/2010 | Nishihara et al. |
| 2010/0103139 A1 * | 4/2010 | Soo et al. ............ 345/175 |
| 2010/0199232 A1 | 8/2010 | Mistry et al. |
| 2011/0254865 A1 * | 10/2011 | Yee et al. ............ 345/661 |

OTHER PUBLICATIONS

Apple Insider Staff, "Inside Apple's latest iPod touch-screen patent filing," Apple Insider, Jul. 2006, 14 Pages.

Office Action dated Nov. 10, 2011 for U.S. Appl. No. 12/249,064, 23 pages.

Office Action dated Jan. 24, 2012 for U.S. Appl. No. 12/256,818, 22 pages.

Notice of Allowance dated Apr. 20, 2012 for U.S. Appl. No. 12/249,064.

Office Action dated Apr. 25, 2013 for U.S. Appl. No. 13/555,806, 20 pages.

Office Action dated Aug. 7, 2013 for U.S. Appl. No. 13/543,479, 47 pages.

Office Action dated May 28, 2014 for U.S. Appl. No. 14/064,718, 16 Pages.

* cited by examiner

AUGMENTED I/O FOR LIMITED FORM FACTOR USER-INTERFACES

CROSS-REFERENCE TO RELATED APPLICATIONS

This application is a continuation of U.S. patent application Ser. No. 13/543,479, filed on Jul. 6, 2012, and entitled, "AUGMENTED I/O FOR LIMITED FORM FACTOR USER-INTERFACES," which is a continuation of U.S. patent application Ser. No. 12/249,064 (now U.S. Pat. No. 8,237,666), filed on Oct. 10, 2008, and entitled, "AUGMENTED I/O FOR LIMITED FORM FACTOR USER-INTERFACES." The entireties of these applications are incorporated herein by reference.

TECHNICAL FIELD

The present application relates generally to enhancing features associated with a user-interface (UI) of limited form factor, and more specifically to coupling UI updates to a position of a selector object hovering or tracking over the UI.

BACKGROUND

The consumer and commercial markets for mobile devices (or other devices of limited size or form factor) such as cellular phones, digital media players, Personal Digital Assistants (PDAs) and similar devices is rapidly growing and has been gaining momentum for some time. Advances in chip technology, ergonomics, user interface (UI) technology, software applications, and the like often spur additional growth potential for many of these devices. Accordingly, many mobile devices are becoming more powerful, capable of delivering increasing functionality, while at the same time becoming less expensive, more compact, and more convenient to operate and carry.

As a result, mobile devices or other devices of limited form factor have the potential to deliver a great deal of computational power. However, such devices also often underscore some of the fundamental challenges associated with the various limitations of these devices, such as small screen size, limited keyboard, short battery life, complex operation and/or high prices due to the need to embed UI components in such a small form factor. These and other limitations can substantially hinder the utility and proliferation of some mobile devices.

In accordance therewith, the consumer and commercial markets for these mobile devices are faced with difficulties in which current trends in the area do not appear adequate to solve. In particular, users of most mobile devices desire simpler, smaller, less expensive hardware, but on the other hand users also desire mobile devices that can provide a richer set of functionality, yet remain simple to use. Miniaturization of electronic devices has reached the point where significant computing power can be delivered in devices smaller than a matchbook. Hence, miniaturization is no longer the primary technological bottleneck for meeting the demands of consumers. Rather, the challenges are increasingly leaning toward the user interface of such devices. For example, technology exists for building a full-featured cellular phone (or other device) that is no larger than a given user's thumb, yet packing a display, keyboard, and other UI features in such a small area is all but impossible. Even devices that have opted to forego keyboards in favor of touch-screen I/O present numerous challenges for the implementation of a successful UI.

DETAILED DESCRIPTION

Figure 1:
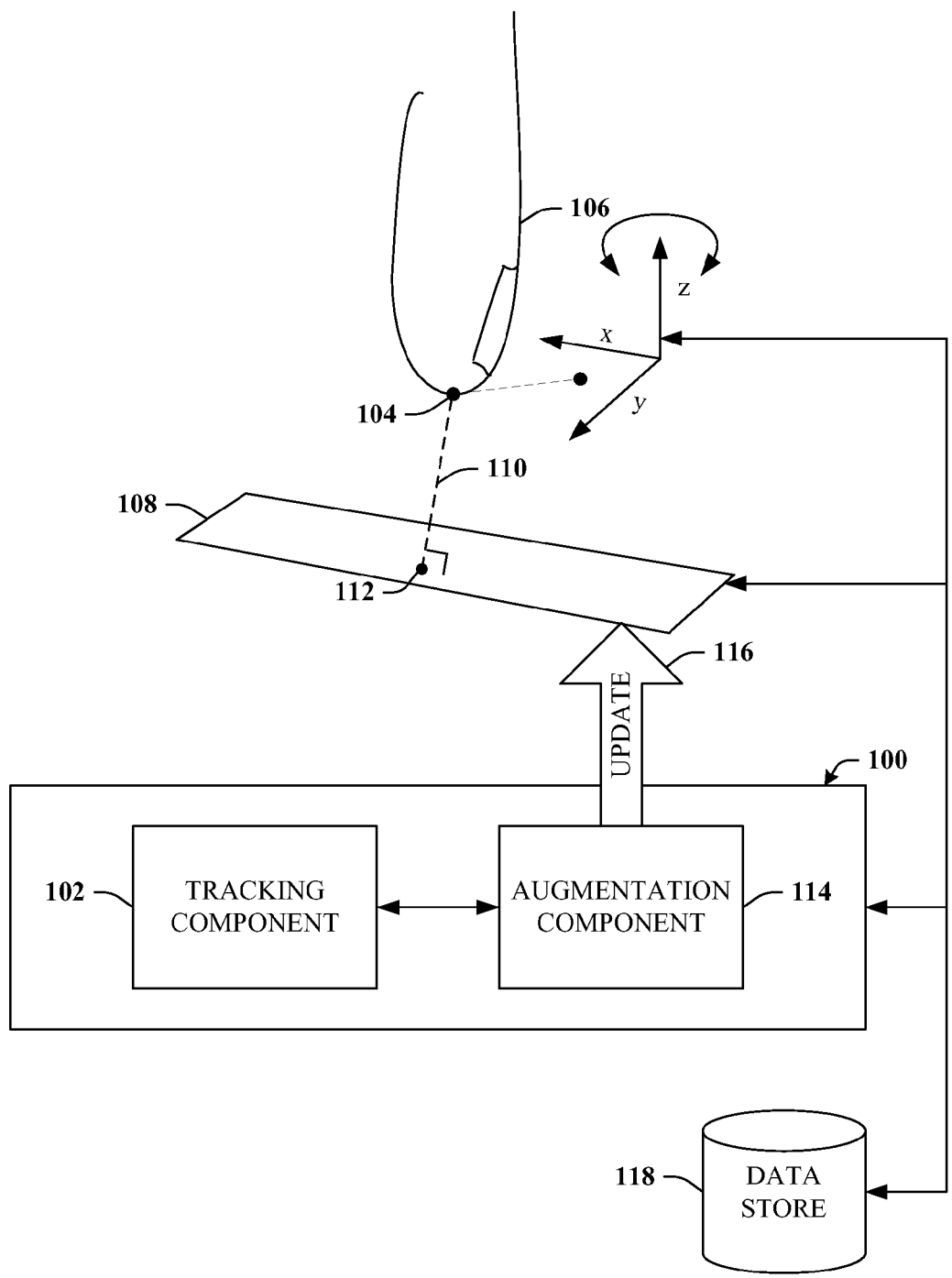
FIG. 1 is a block diagram of a system that can enhance or simplify tactile-related input/output (I/O) in connection with a user-interface (UI) of limited form factor.

The claimed subject matter is now described with reference to the drawings, wherein like reference numerals are used to refer to like elements throughout. In the following description, for purposes of explanation, numerous specific details are set forth in order to provide a thorough understanding of the claimed subject matter. It may be evident, however, that the claimed subject matter may be practiced without these specific details. In other instances, well-known structures and devices are shown in block diagram form in order to facilitate describing the claimed subject matter.

As used in this application, the terms "component," "module," "system", or the like can refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope or spirit of the claimed subject matter.

Moreover, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

As used herein, the terms to "infer" or "inference" refer generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

The subject matter disclosed and claimed herein, in one aspect thereof, comprises an architecture that can simplify or enhance tactile-related input/output (I/O) in connection with a user-interface (UI) of limited form factor. In accordance therewith and to other related ends, the architecture can monitor a position of a selector object relative to a UI display as the selector object hovers above and/or tracks across the UI display. Typically, the selector object will be a device operator's finger, a stylus, or another suitable object. Based upon the position of the selector object, the architecture can update an output of the UI display.

In particular, the architecture can update a portion of the UI display that is local to (and moves or tracks with) the selector objector. For instance, the position can be mapped to a coordinate for the UI display, with the portion to be updated substantially centered at the coordinate. The update can relate to a change in the magnification scale for the portion of the UI display that is updated, in effect providing a virtual magnifying glass. Thus, certain elements in the UI display (e.g., determined by the position of the selector object) can be easier to recognize and/or select, yet the "big picture" can still be apparent. Given that the virtual magnifying glass can require that the selected portion of the UI display be redrawn at a larger scale, the virtual magnifying glass can be implemented to occlude neighboring elements of the UI display.

Additionally or alternatively, these neighboring elements can be presented in a semi-transparent manner, or crowded together to fit in the remaining areas of the UI display. Moreover, the architecture can facilitate other updates beyond magnification, such as highlighting or other appropriate changes to RGB features of portions of the UI display.

The monitoring of the selector object and/or the updating of the UI display can be intelligently activated and deactivated in order to conserve power and maximize or tailor effective use. For example, one or both of the monitoring or the updating can be activated when a keyboard application is instantiated, and then deactivated when the keyboard application is closed. In some cases, the monitoring can be active, while the updating is inactive to allow gestures associated with the selector object to represent input, such as a gesture command to activate the virtual magnifying glass or another update.

The following description and the annexed drawings set forth in detail certain illustrative aspects of the claimed subject matter. These aspects are indicative, however, of but a few of the various ways in which the principles of the claimed subject matter may be employed and the claimed subject matter is intended to include all such aspects and their equivalents. Other advantages and distinguishing features of the claimed subject matter will become apparent from the following detailed description of the claimed subject matter when considered in conjunction with the drawings.

Referring now to the drawing, with reference initially to FIG. 1, system 100 that can enhance or simplify tactile-related input/output (I/O) in connection with a user-interface (UI) of limited form factor is depicted. In particular, tactile-related I/O can include, e.g., inputs provided by means of touch or gestures. Generally, system 100 can include tracking component 102 that can monitor position 104 of selector object 106 relative to UI display 108. Position 104 is typically a salient point or feature of selector object 106, or the nearest portion of selector object 106 to UI display 108.

As depicted, selector object 106 can be a finger or thumb of an operator or user of a device (not shown) associated with UI display 108. In addition, selector object 106 can also be a stylus or another physical object suitable for tactile-based I/O. Appreciably, selector object 106 can include a transmitter or other signaling hardware or special purpose material to aid in position tracking, however, such need not necessarily be the case. Rather, tracking component 102 can rely upon one or more camera that can detect objects proximal to UI display 108. For example, UI display 108, in addition to displaying content can also include one or an array of cameras. In other cases, tracking component 102 can monitor position 104 based upon techniques described herein and incorporated by reference.

Regardless of the type or range of sensors employed to determine position 104, position 104 can include x-y values for a coordinate plane that is substantially parallel to a surface of UI display 108. In addition, position 104 can also include a distance between selector object 106 and UI display 108, which is here represented by a length of dashed line 110. Line 110 can be substantially perpendicular to the surface of UI display 108, intersecting UI display 108 at coordinate 112, which can be additionally or alternatively described as the point or pixel over which selector object 106 is hovering as determined by a suitable sensing means. Appreciably, as selector object 106 moves, tracking component 102 can update position 104 commensurately, and therefore, if necessary, also update coordinate 112. It should be understood that Cartesian coordinates are employed for the sake of ready understanding; however, it should be appreciated that polar coordinates or another coordinate system can be employed to map and/or track position 104 or coordinate 112.

Additionally, system 100 can further include augmentation component 114 that can update (e.g., update 116) an output of UI display 108 based upon position 104 of selector object 106. More particularly, augmentation component 114 can update the output of UI display 108 at, or for an area centered at, coordinate 112. In an aspect of the claimed subject matter, update 116 can relate to changing a display or magnification scale of a portion (e.g., a portion centered at coordinate 112) of UI display 108. These and other features will become more apparent with reference FIGS. 2-4, which can be examined along side FIG. 1 for additional context and understanding.

Furthermore system 100 can also include or be operatively connected to data store 118. Data store 118 is intended to be a repository of all or portions of data, data sets, or information described herein or otherwise suitable for use with the claimed subject matter. Data store 118 can be centralized, either remotely or locally cached, or distributed, potentially across multiple devices and/or schemas. Furthermore, data store 118 can be embodied as substantially any type of memory, including but not limited to volatile or non-volatile, sequential access, structured access, or random access and so on. It should be understood that all or portions of data store 118 can be included in system 100, or can reside in part or entirely remotely from system 100.

Figure 2:
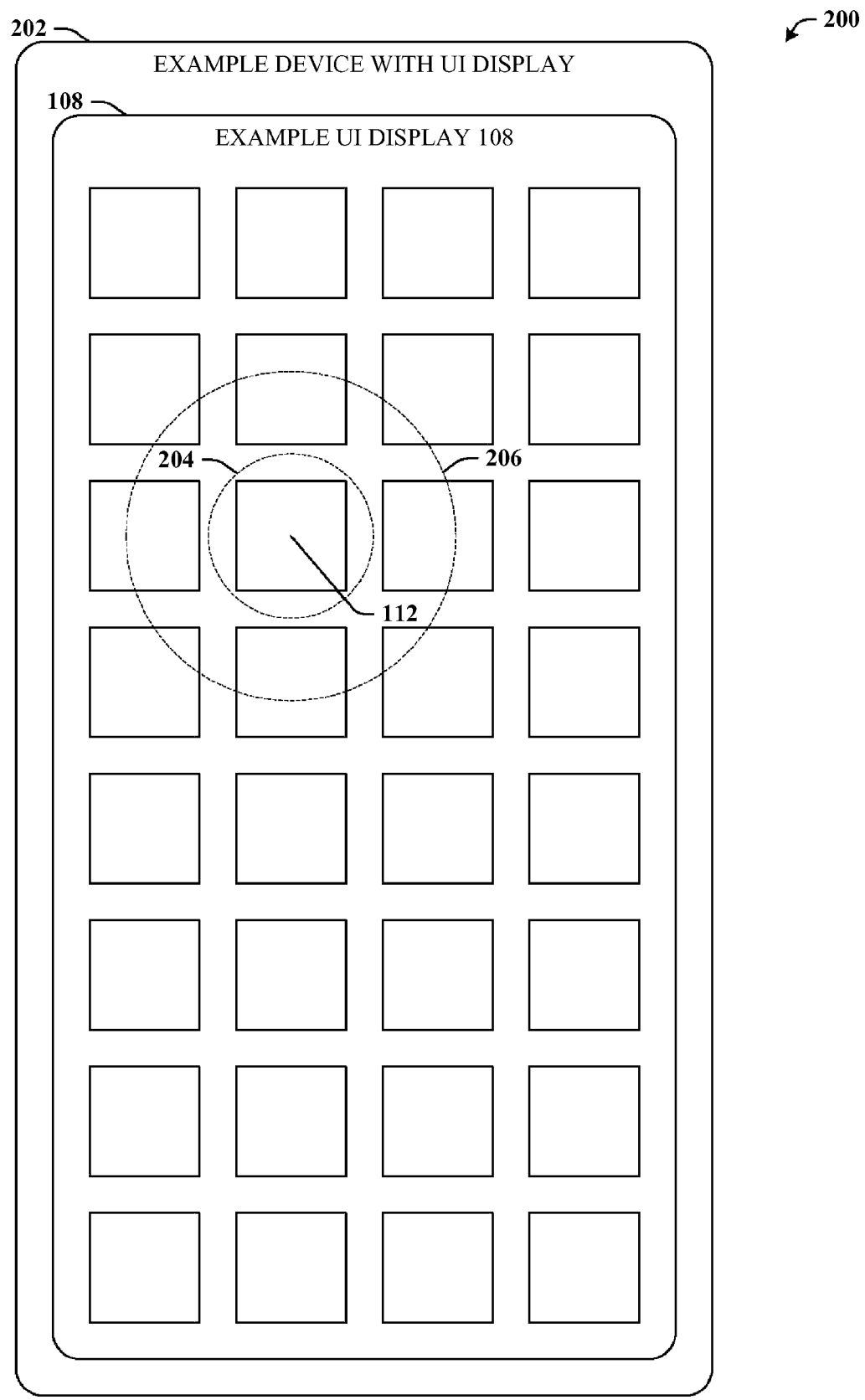
FIG. 2 depicts a block diagram illustration that exemplifies various features associated with preparing to update a display based a position of a selector object.

Turning now to FIG. 2, illustration 200 that exemplifies various features associated with preparing to update a display based a position of a selector object is provided. Example device 202 can be substantially any device that includes UI display 108, an example of which is also illustrated here. Typically, device 202 is a mobile device contemplated to include a limited UI form factor such as a cellular or smart phone (or other device), media player, or Personal Digital Assistant (PDA). UI display 108 can be a "touch screen," e.g., a touch-sensitive display that accepts an input based upon contact between UI display 108 and selector object 106.

Implementing a touch screen can help mitigate the conflict between miniaturization and providing rich feature sets/easily navigable UIs. For example, rather than attaching a physical keypad/keyboard, the touch screen can provide virtual keys, thus removing the need to devote non-screen real estate to buttons or keys. However, when many elements are simultaneously displayed within UI 108 such as keys of a keyboard, photos in a photo album, folders or files in a directory, or other icons or graphical elements, certain difficulties can arise. One such example is the well-known "fat finger" difficulty, wherein due to the limited size of UI display 108 and a given number of elements displayed (e.g., the entire keyboard), each element can be smaller than an operator's finger, commonly resulting in multiple selection events when only one is intended or a selection of the incorrect element (e.g., pressing the wrong key). Unfortunately, changing the scale of each element or key implies that only a portion of the whole (e.g., only half of the keyboard) will be displayed at any given time, which can lead to other difficulties or inefficiencies and can further be less intuitive.

In order to mitigate these and other difficulties, augmentation component 114 can selectively update a certain portion of UI display 108 without necessarily affecting other portions of UI display 108 or changing the total number of elements displayed. In accordance therewith, example UI display 108 of illustration 200 includes numerous elements depicted as squares or blocks. As indicated supra, each of these blocks can represent a distinct key of a keyboard, a photo in an electronic album, a folder or file in a directory, an icon or the like.

Coordinate 112, representing, e.g., the point or pixel over which selector object 106 is hovering is also depicted in illustration 200. Thus, augmentation component 114 that can update an output of UI display 108 based upon position 104 of selector object 106, can also map position 104 to coordinate 112. The update can take to form of magnification or increasing the magnification scale of UI display 108, but usually only within a certain area of effect. Accordingly, the magnification scale of certain portions of UI display 108 can be increased to simplify input or selection of an element, yet without compromising the operator's orientation or view of the whole (e.g., all the other elements, their respective relationships or relative locations).

In other words, augmentation component 114 can provide a virtual magnifying glass that increases a magnification scale of a portion of UI display 108 such that the portion is displayed at a different scale within an area of effect of the virtual magnifying glass. In this case, the portion of UI display 108 that can be magnified is represented by circle 204, whereas circle 206 represents the area of effect of the virtual magnifying glass. Thus, visual data included in portion 204, after magnification, will occupy the larger area 206, and hence be capable of display at a greater magnification scale. Hence, because circle 206 has a radius that is approximately twice as large as circle 204, graphical elements included in portion 204 can be updated to appear twice a large as would otherwise occur.

Appreciably, portion 204 and area 206 need not necessarily be circles, but can be other suitable shapes as well, but are illustrated here as circles merely to simplify explanation. Likewise, a 2-1 ratio between area 206 and portion 204 is selected to provide a convenient example; however, one can readily appreciate that other ratios can be employed. In fact, the sizes (as well as shapes) of portion 204 and area 206 can be determined independently from one another, yet, the size ratio between the two will typically represent the level of magnification (e.g., the change in magnification scale).

For example, portion 204 can be defined by operator preferences or defaults, yet can be intelligently adjusted to comport with the sizes of the elements of UI display 108 (e.g., the illustrated blocks). Accordingly, the magnified portions can be comparable to the size of elements of interest to an operator. Based upon such adjustments area 206 can, but need not, be adjusted as well. Similarly, area 206 can also be defined by operator preferences or defaults, but can be adjusted, potentially independently of the size of portion 204, by, e.g., modifying the hover distance (e.g., distance 110) of selector object 106. For instance, decreasing the hover distance of an operator's finger over the surface of UI display 108 can increase the size of area 206, while increasing the hover distance can decrease the size of area 206. For instance, when selector object 106 hovers at the limits of detectable range, then the magnification scale can be set to 2 times normal or even no magnification. However, as selector object 106 crosses tiered thresholds relating to hover distance 110 (e.g., the z-axis of the coordinate plane), then the magnification scale can be increased by discrete amounts, such as 4×, 8×, and so on until the maximum magnification scale, say 16× is reached at actual contact (or within a few millimeters of actual contact) with UI display 108. It should be appreciated that the magnification scale need not necessarily be multiples of 2, and further need not be integers. Hence, magnification can be 2.5× or similar.

Moreover, it should also be understood that while coordinate 112 is substantially based upon position 104 of selector object 106, coordinate 112 can be further based upon or biased toward a central location of an element included in UI display 108. Hence, while position 104 of the operator's finger might actually be mapped to a coordinate that is near the outer edge of the indicated element, or perhaps even beyond the edges of the element, coordinate 112 can be intelligently biased toward the center of the element since it can be inferred in many cases that the operator is not interested in selecting a portion of the screen that is not occupied by a selectable element or in magnifying portions of the background exiting between elements.

For the sake of thoroughness, it should be noted that providing a virtual magnifying glass is not necessarily limited to instances in which there are many discreet elements presented by UI display 108. Rather, for example, UI display 108 can present a single element such as map or high-resolution photograph such that this single element occupies substantially all of UI display 108. In this case, as selector object 106 traverses over the map or photograph, associated portions of UI display 108 can be resolved into clearer or more detailed depictions. Similarly, an element can be a thumbnail that, when magnified presents a larger scale view.

In addition, augmentation component 114 is not necessarily limited to application of a virtual magnifying glass, but can also provide other types of updates to UI display 108. For example, augmentation component 114 can update the output of UI display 108 by affecting a change in a color, a contrast, a brightness level, or some other Red-Green-Blue (RGB) attribute of one or a set of pixels included in UI display 108, typically pixels of one or more element associated with coordinate 112 and therefore, by proxy, associated with position 104. As one example, consider again the situation in which example UI display 108 presents a virtual keyboard. As the operator's finger hovers over the surface, the key that is substantially beneath the finger can change color or be highlighted to provide a visual cue to aid in selecting the desired element in spite of other difficulties described herein or otherwise extant.

Figure 3:
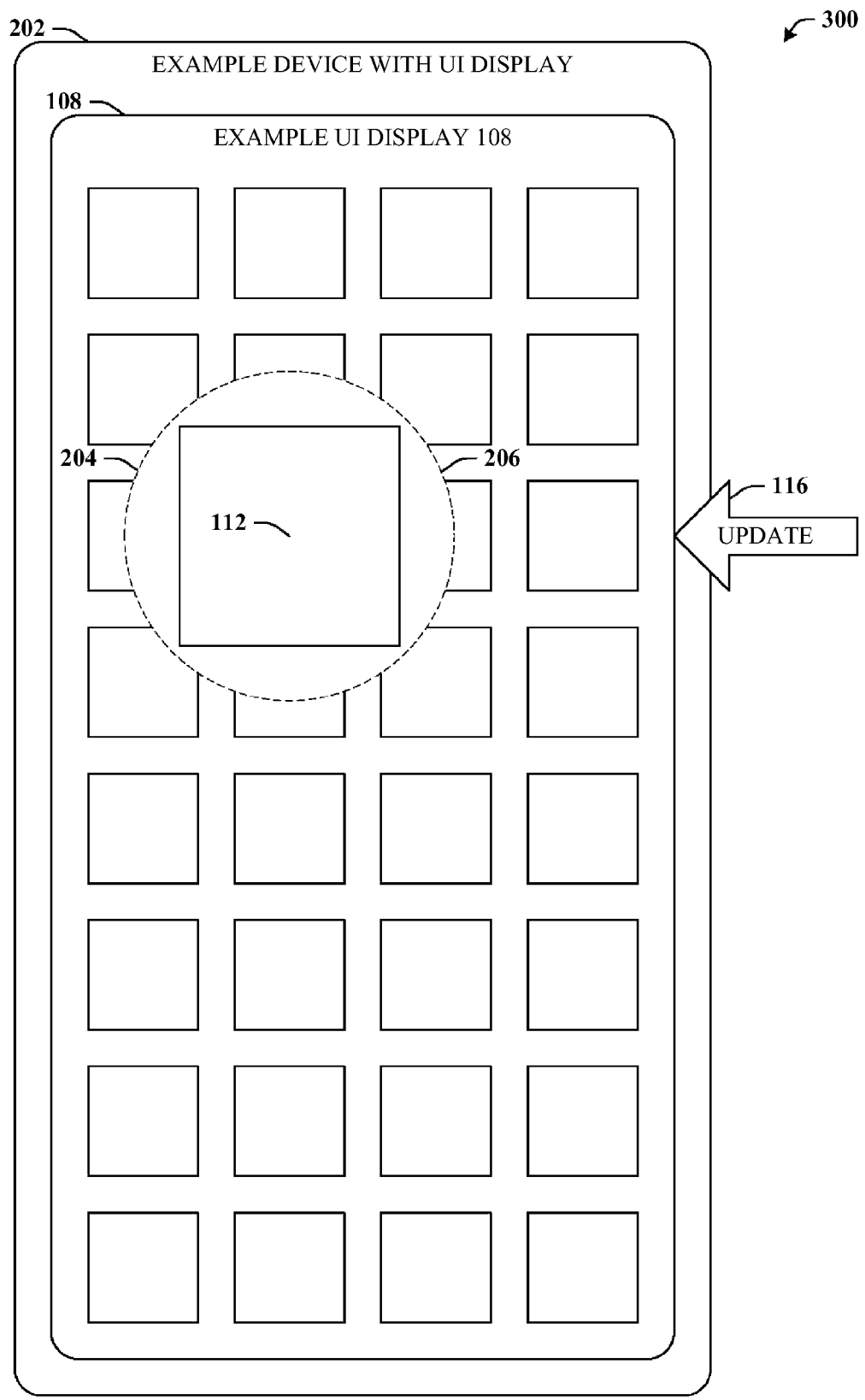
FIG. 3 provides a block diagram illustration that exemplifies a virtual magnifying glass that occludes neighboring elements.

FIG. 3 depicts illustration 300 that exemplifies a virtual magnifying glass that occludes neighboring elements. As with FIG. 2, example device 202 includes UI display 108. In this case, with coordinate 112 again mapped approximately to the center of the element, portion 204 can now be redrawn and can be equal to area 206 in terms of size. Accordingly, when update 116 is applied, portion 204 is displayed at a different scale, the display of which can occlude neighboring elements in UI display 108. For example, the elements occluded can be those within area of effect 206, as depicted.

It should be appreciated that although not expressly depicted, according to an aspect of the claimed subject matter, the elements in UI display 108 excluded from portion 204 but within area of effect 206 of the virtual magnifying glass (e.g., those elements described above as occluded), can instead be updated to become semi-transparent in order to avoid total occlusion. Moreover, yet another implementation of the virtual magnifying glass is provided in connection with FIG. 4.

Figure 4:
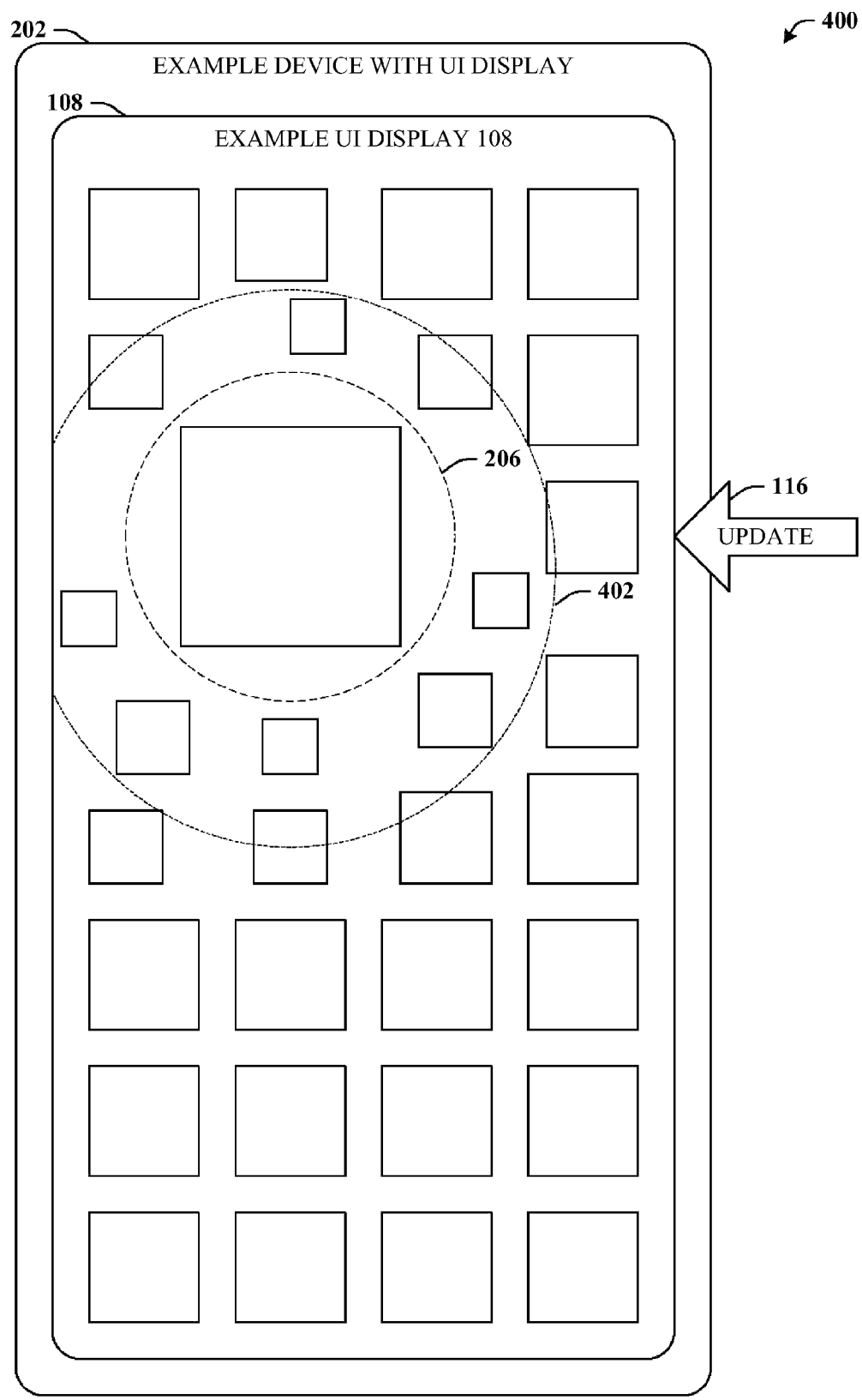
FIG. 4 depicts a block diagram illustration that exemplifies a virtual magnifying glass that facilitates crowding rather than occlusion.

Referring now to FIG. 4, illustration 400 that exemplifies a virtual magnifying glass that facilitates crowding rather than occlusion is depicted. Once more, example device 202 with UI display 108 is provided. In this case, update 116 provided by, e.g., augmentation component 114 can (in addition to updating area of effect 206) also modify UI display 108 in secondary area of effect 402. In particular, augmentation component 114 can decrease the magnification scale for otherwise occluded neighboring elements, and can display such elements within secondary area of effect 402 in a crowded fashion. In other words, so as not to occlude the neighboring elements, those elements as well as elements slightly beyond area of effect 206 can be effectively reduced in size and/or crowded together to fit, whereas the remainder of UI display 108 can remain unaffected.

Figure 5:
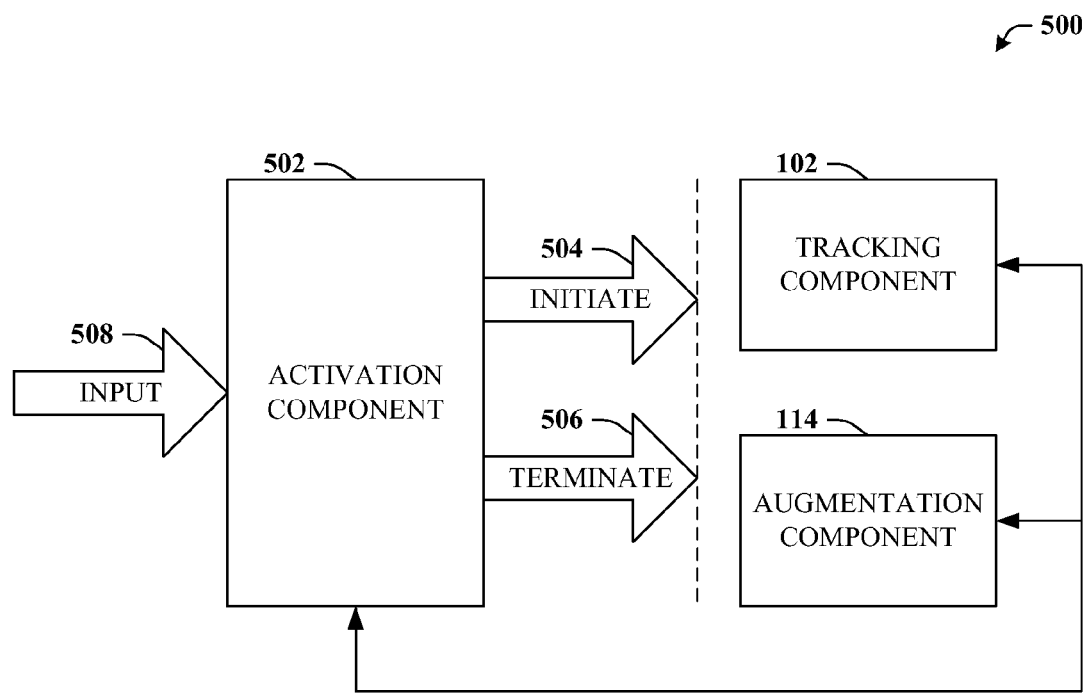
FIG. 5 is a block diagram of a system that can selectively trigger the monitoring or the updating.

With reference now to FIG. 5, system 500 that can selectively trigger the monitoring or the updating is illustrated. Generally, system 500 can include tracking component 102 that can monitor position 104 relative to UI display 108; and augmentation component 114 that can update UI display 108 according to position 104, both as substantially described supra. In addition, system 500 can also include activation component 502 that can initiate at least one of the monitoring associated with tracking component 102 or the updating of UI display 108 associated with augmentation component 114.

For example, activation component 502 can generate and transmit initiation message 504 to one or both tracking component 102 or augmentation component 114. Initiation message 504 can thus trigger one or both the monitoring of position 104 or the updating of UI display 104 that is based upon position 104. Similarly, in an aspect of the disclosed subject matter, activation component 502 can also send termination message 506 that can terminate operation of the monitoring and/or updating. Accordingly, while various features have been described herein relating to modifying portions of the display based upon position 104 of selector object 106, it should be appreciated that such features can be selectively activated and/or deactivated when not needed or desired.

In an aspect, activation component 502 can initiate (or terminate) the monitoring by tracking component 102 or the updating by augmentation component 114 based upon various criteria or parameters, some or all of which can be provided by input 508. For example, initiation message 504 (or termination message 506) can be provided based upon a state of a device associated with UI display 108. An illustration of this can be entering into (or exiting) a keyboard mode for the device. Thus, activation component 502 can obtain data relating to this state by way of input 502. As another example, messages 504 or 506 can be provided based upon an application instantiated by a device associate with UI display 108. For instance, calling/closing a photo album application can activate/terminate the monitoring and/or updating, when, e.g., input 502 indicating the particular application was instantiated or closed is received.

Of course, numerous other examples can exist. Activation component 502 can provide the suitable message based upon a number of graphical elements included in UI display 108 such as when UI display 108 is displaying a large list or a large number of files, folders, or icons. As another example, messages 504, 506 can be provided based upon a magnification scale of the graphical elements included in UI display 108. For example, when elements are displayed at relatively small scales, such can be a criteria (received or otherwise determined or obtained as input 502) for activating the claimed features; or, likewise when the elements are displayed at a more normal scale or one that is determined or inferred to be easily distinguishable, then the updating can be terminated as magnification or other features can be less useful in those cases.

As yet another example, activation component 502 can initiate the monitoring or the updating based upon a complexity of one or more graphical elements. For instance, display of a highly complex element such as an image of a map or a photograph can prompt message 504. In other cases, message 504 can be intelligently generated when a relatively large number of correction-based or undo-based device inputs (e.g., backspace, delete . . . ) are detected. It should be further appreciated that settings related to triggering the monitoring or updating can be defined by operator preferences. Moreover, it should be further understood that monitoring position 104 of selector object 106 (e.g., by tracking component 102) can be active, even while updates that would otherwise be performed by augmentation component 114 is not active. Hence, tracking component 106 can detect the presence and trajectory of an operator's finger when it is suitably proximal to UI display 108, even though no augmentations to the output are provided. Accordingly, a predefined gesture by selector object 106 (e.g., moving one's finger in a particular pattern), can instantiate the updating aspects, while another gesture or pattern can be utilized to turn the UI updating off.

Figure 6:
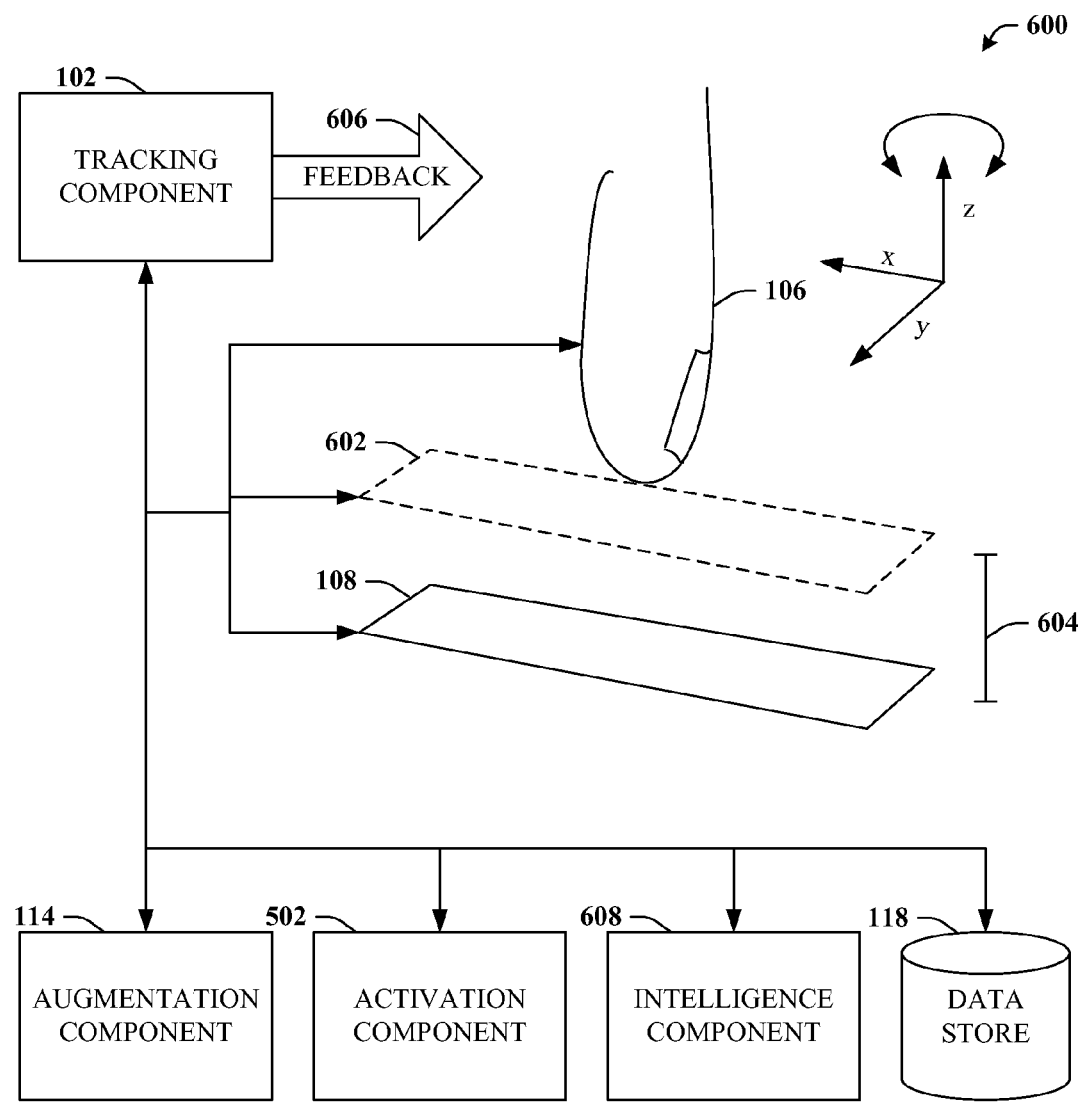
FIG. 6 illustrates a block diagram of a system that can provide a pseudo-touch screen

Turning now to FIG. 6, system 600 that can provide a pseudo-touch screen is depicted. Typically, system 600 can include tracking component 102, augmentation component 114, and activation component 502 as substantially described supra. However, in addition to what has been described, tracking component 102 can further utilize a distance parameter to effectuate pseudo-surface 602 at distance 604 from a surface of UI display 108. For example, pseudo-surface 602 can represent a plane that is substantially parallel to and bounded to some degree in shape and size to that of UI display 108, but some distance 604 away from UI display 108. When selector object 106 breaks a plane associated with pseudo-surface 602, such activity can simulate contact with UI display 108. In other words, actual physical contact with UI display 108 can be simulated without touching or otherwise making contact with UI display 108.

Appreciably, the features detailed supra can incorporate various gestures. For instance an abrupt downward motion by selector object 106 can indicate a keystroke or selection for a touch screen, even without actually touching the screen. Such can be beneficial in a number of ways. For example, the surface of a touch-screen as well as associated sensors can be protected from damage or wear. Additionally, the surface of a touch-screen need not be exposed to fingerprints or other soiling that commonly results from use. As another advantage, it is also possible to simulate a touch-screen display, even when the requisite hardware is not entirely available. Hence, a common display can be made to emulate a touch-screen display in some cases by monitoring the behavior of selector object 106.

It is understood that one potentially important aspect of any given UI can be operator feedback, which can often indicate or reinforce the occurrence of certain I/O transactions. For example, in the case of a conventional keyboard, an operator receives both tactile and audio feedback when keys are pressed. While an operator might not be consciously aware of such feedback during use, operators tend to notice when that same feedback is lacking. Similarly, for touch-screen inputs, the operator receives tactile feedback when contact with the touch-screen is made, which verifies to the operator that the intended transaction (e.g., touching the screen at the intended location) has occurred. However, given that pseudo-surface 602 typically will not include a physical surface capable of imparting tactile feedback, other forms or types of feedback can be provided instead. In accordance therewith, tracking component 102 can facilitate feedback when selector object 106 breaks the plane associated with pseudo-surface 602 by way of a signal 606. For instance, when the plane is broken or a command gesture is detected, feedback signal 606 can be transmitted to a suitable I/O component of a UI to provide, e.g., an auditory "click" to denote a key-press, or some other suitable feedback. As another example, visual feedback can be provided as well, such as a visual "click," a flash, highlighting features and so forth.

In addition, system 600 can also include intelligence component 608 that can provide for or aid in various inferences or determinations. It is to be appreciated that intelligence component 608 can be operatively coupled to all or some of the aforementioned components, e.g., 102, 114, and 502. Additionally or alternatively, all or portions of intelligence component 608 can be included in one or more components described herein. Moreover, intelligence component 608 will typically have access to all or portions of data sets described herein, such as access to data store 118, and can furthermore utilize previously determined or inferred data.

For example, intelligence component 608 can aid tracking component 102 by intelligently determining or inferring distance 602. As an example, machine learning techniques can be employed to analyze aspects of position 104 to establish a normal or comfortable hover distance for a particular operator during I/O transactions. Based upon this operator-specific hover distance, distance 604 can be set, generally slightly less than the hover distance to register "clicks" when the pseudo-surface plane is broken. Likewise, intelligence component 608 can aid augmentation component 114 in intelligently determining or inferring what type of update to be employed. For instance, suppose a virtual keyboard application is instantiated. Initially, the update can relate to highlighting the keys based upon position 104 in order to provide a visual aid in key selection. However, if a number of errors are made or that the size of the keys are below a certain threshold, then augmentation component 114 can employ or switch to the virtual magnifying glass. Additionally, the activation or termination of the updates to UI display 108 described herein in connection with activation component 502 can be facilitated or assisted by intelligence component 608.

Accordingly, in order to provide for or aid in the numerous inferences described herein, intelligence component 608 can examine the entirety or a subset of the data available and can provide for reasoning about or infer states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data.

Such inference can result in the construction of new events or actions from a set of observed events and/or stored event data, whether or not the events are correlated in close temporal proximity, and whether the events and data come from one or several event and data sources. Various classification (explicitly and/or implicitly trained) schemes and/or systems (e.g., support vector machines, neural networks, expert systems, Bayesian belief networks, fuzzy logic, data fusion engines . . . ) can be employed in connection with performing automatic and/or inferred action in connection with the claimed subject matter.

A classifier can be a function that maps an input attribute vector, $x=(x1, x2, x3, x4, xn)$, to a confidence that the input belongs to a class, that is, $f(x)=confidence(class)$. Such classification can employ a probabilistic and/or statistical-based analysis (e.g., factoring into the analysis utilities and costs) to prognose or infer an action that a user desires to be automatically performed. A support vector machine (SVM) is an example of a classifier that can be employed. The SVM operates by finding a hypersurface in the space of possible inputs, where the hypersurface attempts to split the triggering criteria from the non-triggering events. Intuitively, this makes the classification correct for testing data that is near, but not identical to training data. Other directed and undirected model classification approaches include, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

Figure 7:
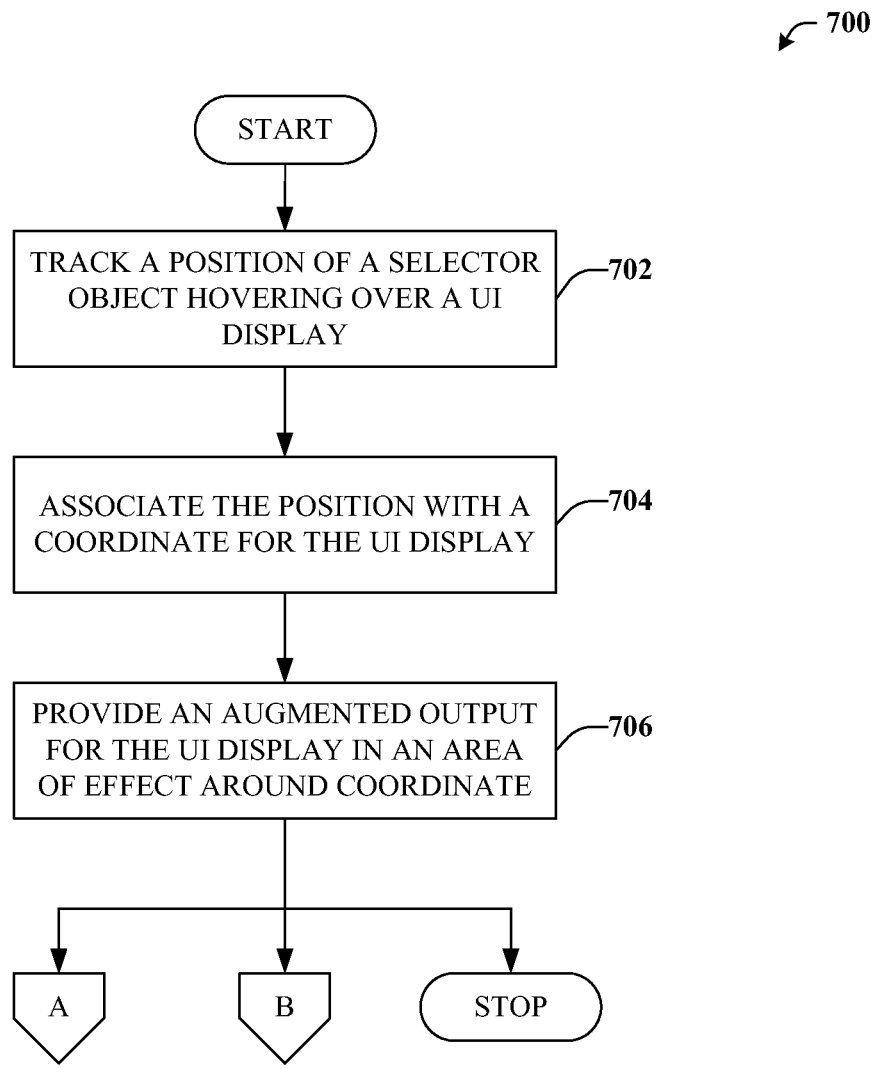
FIG. 7 is an exemplary flow chart of procedures that define a method for enhancing or simplifying tactile-related I/O for a UI with a limited form factor.
Figure 8:
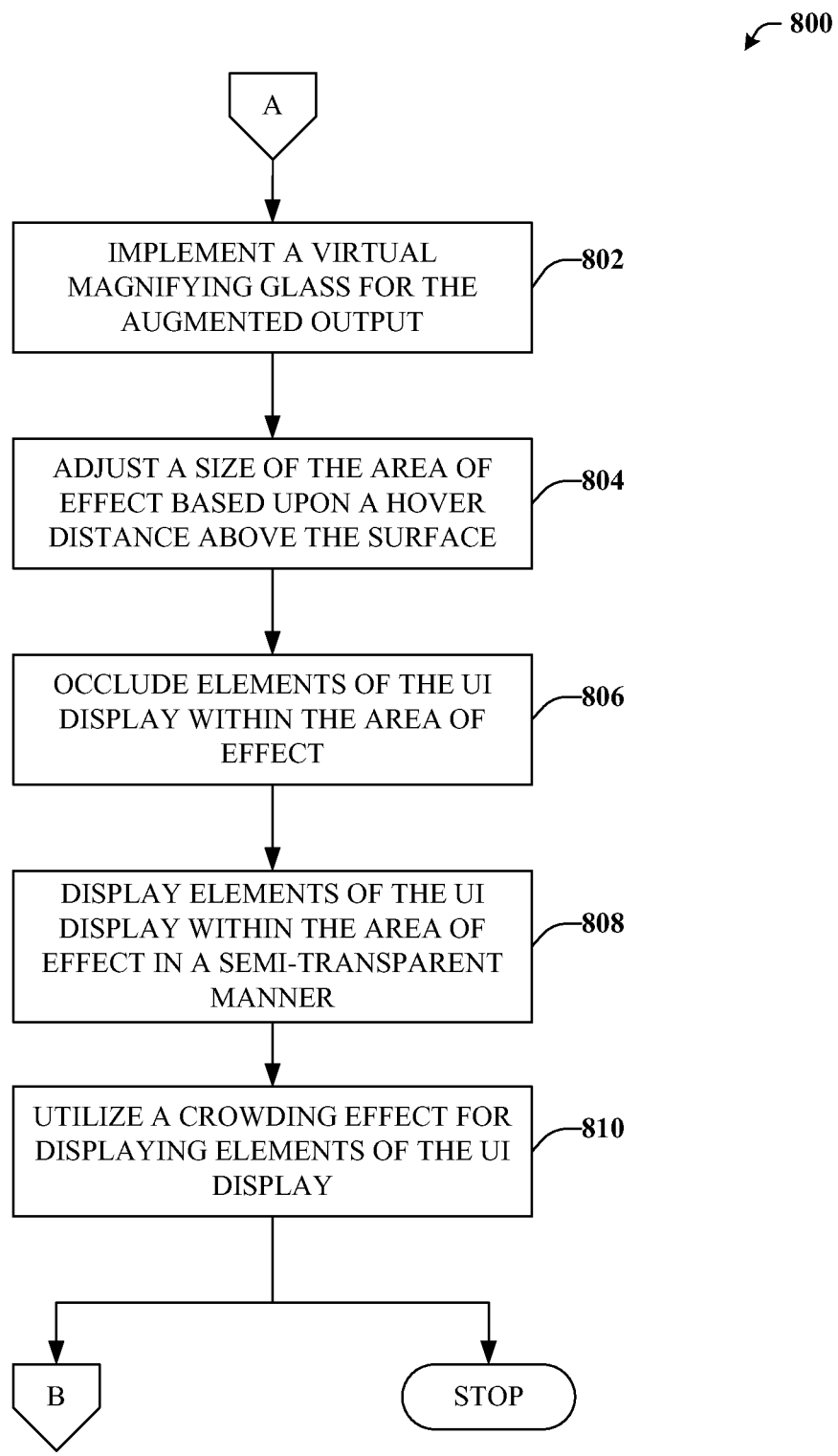
FIG. 8 is an exemplary flow chart of procedures that define a method for implementing a virtual magnifying glass.
Figure 9:
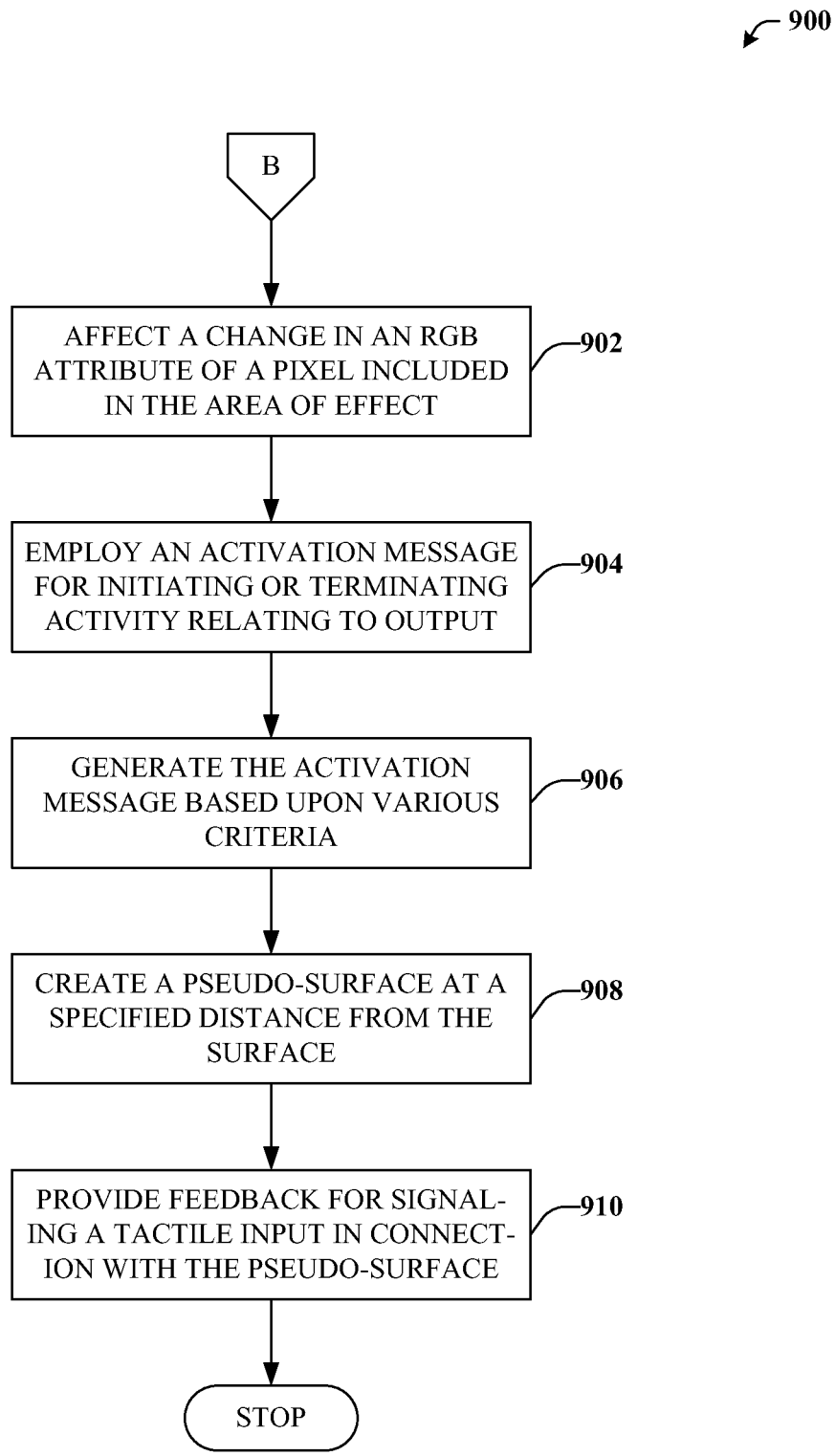
FIG. 9 depicts an exemplary flow chart of procedures defining a method for providing additional features associated with enhancing or simplifying I/O for a limited form factor UI.

FIGS. 7, 8, and 9 illustrate various methodologies in accordance with the claimed subject matter. While, for purposes of simplicity of explanation, the methodologies are shown and described as a series of acts, it is to be understood and appreciated that the claimed subject matter is not limited by the order of acts, as some acts may occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the claimed subject matter. Additionally, it should be further appreciated that the methodologies disclosed hereinafter and throughout this specification are capable of being stored on an article of manufacture to facilitate transporting and transferring such methodologies to computers. The term article of manufacture, as used herein, is intended to encompass a computer program accessible from any computer-readable device, carrier, or media.

Turning now to FIG. 7, exemplary method 700 for enhancing or simplifying tactile-related I/O for a UI with a limited form factor is illustrated. Generally, at reference numeral 702, a position of a selector object hovering over a UI display can be tracked. The position can be defined as a salient portion of the selector object and/or the nearest portion of the selector object to the UI display. In addition, the position can be sampled over time in order to determine motion or a trajectory of the selector object. Hence, gestures or other motions can be identified. It should be understood that the selector object can be an appendage of an operator interacting with the UI display, such as a finger or thumb, and can also be a stylus or pointer.

Next to be described, at reference numeral 704, the position can be associated with a coordinate of the UI display. Typically, the coordinate will represent a point or pixel on the UI display that is substantially below the selector object. In other words, the coordinate can be substantially along a line adjoining a surface of the UI display to the selector object, wherein the line is perpendicular to the surface of the UI display. At reference numeral 706, an augmented output for the UI display can be provided in an area of effect that is substantially centered at the coordinate. Thus, the UI display can be modified or updated locally based upon the position of an operator's finger (e.g., selector object) hovering over the UI display.

With reference now FIG. 8, exemplary method 800 for implementing a virtual magnifying glass is provided. In accordance therewith, at reference numeral 802, a virtual magnifying glass that increases the magnification scale of a magnified area of the UI display can be implemented for the augmented output detailed at reference numeral 706. Thus, the magnified area around the coordinate can be expanded to fit the area of effect in order to effectuate the magnification.

At reference numeral 804, a size of the area of effect can be adjusted based upon a hover distance representing a distance between the surface and the selector object. Thus, by modifying the distance between the selector object and the UI display, the level of magnification as well as the size of the magnified area can be adjusted. It should be appreciated that the virtual magnifying glass can be effectuated according to a variety of distinct schemes. For example, at reference numeral 806, elements of the UI display that are included within the area of effect but not included within the magnified area can be occluded. In other words, the magnified area occludes nearby features of the UI display to allow the magnified area to be displayed at a greater magnification scale.

At reference numeral 808, these nearby features can avoid total occlusion. For instance, elements of the UI display that are included within the area of effect but not included within the magnified area can be displayed in a semi-transparent manner. Thus, rather than total occlusion for neighboring elements, these elements can be visible by adjusting the transparency. As a third example, at reference numeral 810, a crowding effect can be utilized for displaying elements of the UI display that are included within a second, larger area of effect but not included within the magnified area. Accordingly, these elements can be distorted to a degree in either size or shape to allow for the updated magnification scale for one portion of the UI display, while still depicting all elements without strict occlusion.

Turning now to FIG. 9, exemplary method 900 for providing additional features associated with enhancing or simplifying I/O for a limited form factor UI is depicted. At reference numeral 902, a change can be affected in at least one of a color, a contrast, a brightness, or a RGB attribute of one or more pixels included in the area of effect. In particular, updates to the UI display are not necessarily limited to adjusting the magnification scale of a portion of the display, but other updates can be facilitated, such as highlighting a particular pixel of group of pixels for instance.

At reference numeral 904, an activation message can be employed for initiating or terminating activity associated with providing the augmented output. For example, as described at reference numeral 706, an augmented output for the UI display can be facilitated in a particular area of effect. However, when these augmented outputs occur can be selectively determined, essentially allowing the augmented output to be switched on or off. For instance, the virtual magnifying glass can be activated when a keyboard application is instantiated, and terminated when the keyboard application is closed.

At reference numeral 906, the activation message can be generated based upon a state of, or application instantiated by, a device associated with the UI display. In an aspect, the activation message can also be generated based upon a number of, a graphical complexity of, or a magnification scale for, graphical elements included in the UI display. Likewise, the activation message can be generated based upon a number of correction-based or undo-based inputs. The activation message can also be generated based upon preferences or settings associated with the UI display, or, in some cases, based upon a predefined gesture executed by the selector object.

In addition, at reference numeral 908, a pseudo-surface can be created at a specified distance from the surface. The pseudo-surface can be employed for simulating a touch-sensitive UI display in a non-contact manner. For example, a touch-screen can be utilized in a contactless manner to reduce wear, maintenance, and/or fingerprints or other soiling to the touch-screen. Moreover, it is also possible to simulate a touch-screen in this manner even though the underlying UI display does not include touch or tactile-based components. At reference numeral 910, feedback such as auditory feedback can be provided for signaling a tactile (e.g., touch) or tactile-based input (e.g., including gestures) in connection with the pseudo-surface.

Figure 10:
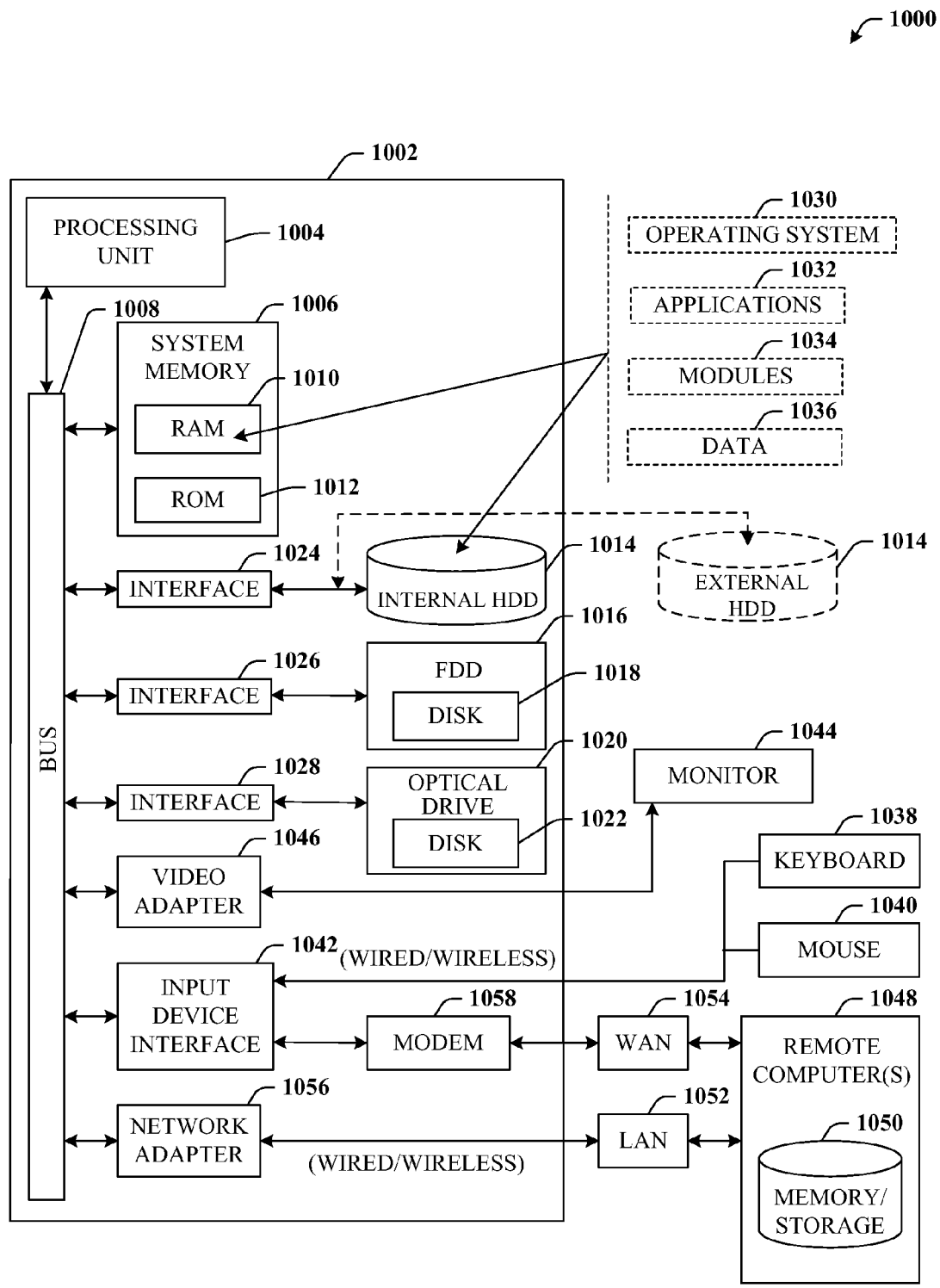
FIG. 10 illustrates a block diagram of a computer operable to execute the disclosed architecture.

Referring now to FIG. 10, there is illustrated a block diagram of an exemplary computer system operable to execute the disclosed architecture. In order to provide additional context for various aspects of the claimed subject matter, FIG. 10 and the following discussion are intended to provide a brief, general description of a suitable computing environment 1000 in which the various aspects of the claimed subject matter can be implemented. Additionally, while the claimed subject matter described above may be suitable for application in the general context of computer-executable instructions that may run on one or more computers, those skilled in the art will recognize that the claimed subject matter also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the claimed subject matter may also be practiced in distributed computing environments where certain tasks are performed by remote processing devices that are linked through a communications network. In a distributed computing environment, program modules can be located in both local and remote memory storage devices.

A computer typically includes a variety of computer-readable media. Computer-readable media can be any available media that can be accessed by the computer and includes both volatile and nonvolatile media, removable and non-removable media. By way of example, and not limitation, computer-readable media can comprise computer storage media and communication media. Computer storage media can include both volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

Continuing to reference FIG. 10, the exemplary environment 1000 for implementing various aspects of the claimed subject matter includes a computer 1002, the computer 1002 including a processing unit 1004, a system memory 1006 and a system bus 1008. The system bus 1008 couples to system components including, but not limited to, the system memory 1006 to the processing unit 1004. The processing unit 1004 can be any of various commercially available processors. Dual microprocessors and other multi-processor architectures may also be employed as the processing unit 1004.

The system bus 1008 can be any of several types of bus structure that may further interconnect to a memory bus (with or without a memory controller), a peripheral bus, and a local bus using any of a variety of commercially available bus architectures. The system memory 1006 includes read-only memory (ROM) 1010 and random access memory (RAM) 1012. A basic input/output system (BIOS) is stored in a non-volatile memory 1010 such as ROM, EPROM, EEPROM, which BIOS contains the basic routines that help to transfer information between elements within the computer 1002, such as during start-up. The RAM 1012 can also include a high-speed RAM such as static RAM for caching data.

The computer 1002 further includes an internal hard disk drive (HDD) 1014 (e.g., EIDE, SATA), which internal hard disk drive 1014 may also be configured for external use in a suitable chassis (not shown), a magnetic floppy disk drive (FDD) 1016, (e.g., to read from or write to a removable diskette 1018) and an optical disk drive 1020, (e.g., reading a CD-ROM disk 1022 or, to read from or write to other high capacity optical media such as the DVD). The hard disk drive 1014, magnetic disk drive 1016 and optical disk drive 1020 can be connected to the system bus 1008 by a hard disk drive interface 1024, a magnetic disk drive interface 1026 and an optical drive interface 1028, respectively. The interface 1024 for external drive implementations includes at least one or both of Universal Serial Bus (USB) and IEEE1394 interface technologies. Other external drive connection technologies are within contemplation of the subject matter claimed herein.

The drives and their associated computer-readable media provide nonvolatile storage of data, data structures, computer-executable instructions, and so forth. For the computer 1002, the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer, such as zip drives, magnetic cassettes, flash memory cards, cartridges, and the like, may also be used in the exemplary operating environment, and further, that any such media may contain computer-executable instructions for performing the methods of the claimed subject matter.

A number of program modules can be stored in the drives and RAM 1012, including an operating system 1030, one or more application programs 1032, other program modules 1034 and program data 1036. All or portions of the operating system, applications, modules, and/or data can also be cached in the RAM 1012. It is appreciated that the claimed subject matter can be implemented with various commercially available operating systems or combinations of operating systems.

A user can enter commands and information into the computer 1002 through one or more wired/wireless input devices, e.g., a keyboard 1038 and a pointing device, such as a mouse 1040. Other input devices (not shown) may include a microphone, an IR remote control, a joystick, a game pad, a stylus pen, touch screen, or the like. These and other input devices are often connected to the processing unit 1004 through an input device interface 1042 that is coupled to the system bus 1008, but can be connected by other interfaces, such as a parallel port, an IEEE1394 serial port, a game port, a USB port, an IR interface, etc.

A monitor 1044 or other type of display device is also connected to the system bus 1008 via an interface, such as a video adapter 1046. In addition to the monitor 1044, a computer typically includes other peripheral output devices (not shown), such as speakers, printers, etc.

The computer 1002 may operate in a networked environment using logical connections via wired and/or wireless communications to one or more remote computers, such as a remote computer(s) 1048. The remote computer(s) 1048 can be a workstation, a server computer, a router, a personal computer, portable computer, microprocessor-based entertainment appliance, a peer device or other common network node, and typically includes many or all of the elements described relative to the computer 1002, although, for purposes of brevity, only a memory/storage device 1050 is illustrated. The logical connections depicted include wired/wireless connectivity to a local area network (LAN) 1052 and/or larger networks, e.g., a wide area network (WAN) 1054. Such LAN and WAN networking environments are commonplace in offices and companies, and facilitate enterprise-wide computer networks, such as intranets, all of which may connect to a global communications network, e.g., the Internet.

When used in a LAN networking environment, the computer 1002 is connected to the local network 1052 through a wired and/or wireless communication network interface or adapter 1056. The adapter 1056 may facilitate wired or wireless communication to the LAN 1052, which may also include a wireless access point disposed thereon for communicating with the wireless adapter 1056.

When used in a WAN networking environment, the computer 1002 can include a modem 1058, or is connected to a communications server on the WAN 1054, or has other means for establishing communications over the WAN 1054, such as by way of the Internet. The modem 1058, which can be internal or external and a wired or wireless device, is connected to the system bus 1008 via the serial port interface 1042. In a networked environment, program modules depicted relative to the computer 1002, or portions thereof, can be stored in the remote memory/storage device 1050. It will be appreciated that the network connections shown are exemplary and other means of establishing a communications link between the computers can be used.

The computer 1002 is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, a bed in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE802.11(a, b, g, n, etc.) to provide secure, reliable, fast wireless connectivity. A Wi-Fi network can be used to connect computers to each other, to the Internet, and to wired networks (which use IEEE802.3 or Ethernet). Wi-Fi networks operate in the unlicensed 2.4 and 5 GHz radio bands, at an 11 Mbps (802.11a) or 54 Mbps (802.11b) data rate, for example, or with products that contain both bands (dual band), so the networks can provide real-world performance similar to the basic 10BaseT wired Ethernet networks used in many offices.

Figure 11:
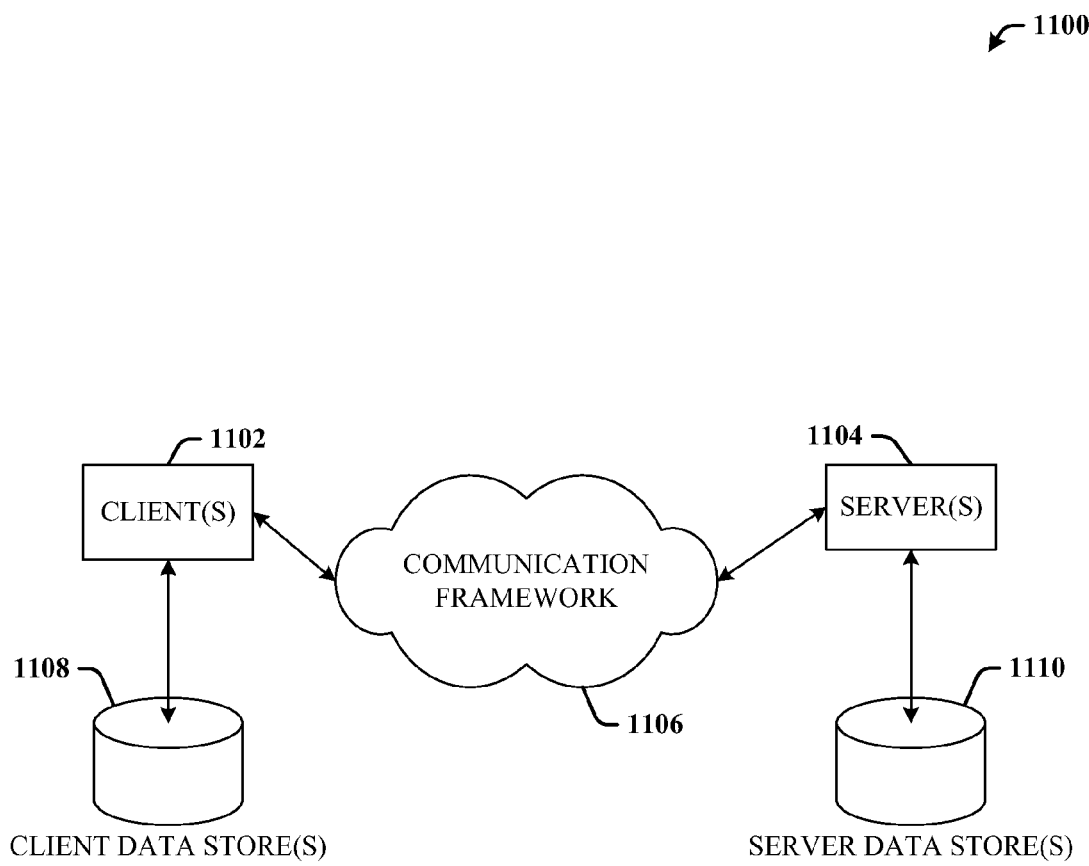
FIG. 11 illustrates a schematic block diagram of an exemplary computing environment.

Referring now to FIG. 11, there is illustrated a schematic block diagram of an exemplary computer compilation system operable to execute the disclosed architecture. The system 1100 includes one or more client(s) 1102. The client(s) 1102 can be hardware and/or software (e.g., threads, processes, computing devices). The client(s) 1102 can house cookie(s) and/or associated contextual information by employing the claimed subject matter, for example.

The system 1100 also includes one or more server(s) 1104. The server(s) 1104 can also be hardware and/or software (e.g., threads, processes, computing devices). The servers 1104 can house threads to perform transformations by employing the claimed subject matter, for example. One possible communication between a client 1102 and a server 1104 can be in the form of a data packet adapted to be transmitted between two or more computer processes. The data packet may include a cookie and/or associated contextual information, for example. The system 1100 includes a communication framework 1106 (e.g., a global communication network such as the Internet) that can be employed to facilitate communications between the client(s) 1102 and the server(s) 1104.

Communications can be facilitated via a wired (including optical fiber) and/or wireless technology. The client(s) 1102 are operatively connected to one or more client data store(s) 1108 that can be employed to store information local to the client(s) 1102 (e.g., cookie(s) and/or associated contextual information). Similarly, the server(s) 1104 are operatively connected to one or more server data store(s) 1110 that can be employed to store information local to the servers 1104.

What has been described above includes examples of the various embodiments. It is, of course, not possible to describe every conceivable combination of components or methodologies for purposes of describing the embodiments, but one of ordinary skill in the art may recognize that many further combinations and permutations are possible. Accordingly, the detailed description is intended to embrace all such alterations, modifications, and variations that fall within the spirit and scope of the appended claims.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the embodiments. In this regard, it will also be recognized that the embodiments includes a system as well as a computer-readable medium having computer-executable instructions for performing the acts and/or events of the various methods.

In addition, while a particular feature may have been disclosed with respect to only one of several implementations, such feature may be combined with one or more other features of the other implementations as may be desired and advantageous for any given or particular application. Furthermore, to the extent that the terms "includes," and "including" and variants thereof are used in either the detailed description or the claims, these terms are intended to be inclusive in a manner similar to the term "comprising."

The invention claimed is:
1. A system, comprising:
   a processor; and a memory that stores executable instructions that, when executed by the processor, facilitate performance of operations, comprising:
    determining that a defined change to a state of an interface display has occurred that relates to a determination of a number of graphical elements, displayed by the interface display, exceeding a threshold number; and
    in response to the defined change being determined to have occurred, augmenting an output of the interface display comprising updating a portion of the output of the interface display as a function of a position of a selector object interacting with the interface display with respect to a surface associated with the interface display.

2. The system of claim 1, wherein the operations further comprise:
    monitoring the position of the selector object in response to the defined change being determined to have occurred and the selector object being determined to be proximate to the interface display.

3. The system of claim 1, wherein the defined change further relates to a change in a presentation, displayed by the interface display, of a graphical element that exceeds a defined magnification setting.

4. The system of claim 1, wherein the defined change further relates to a change of a graphical element in a presentation by the interface display that exceeds a defined level of complexity.

5. The system of claim 1, wherein the defined change further relates to a defined gesture associated with the selector object.

6. The system of claim 1, wherein the portion of the output of the interface display is biased toward a defined central location of a graphical element of the graphical elements presented by the interface display.

7. The system of claim 1, wherein the updating the portion of the output of the interface display comprises displaying the portion of the interface display at a different magnification scale than a remainder of the output of the interface display.

8. The system of claim 1, wherein the updating of the portion of the output of the interface display comprises altering a magnification of the portion of the output as a function of a hover distance from the selector object to the surface in response to the selector object crossing a set of tiered thresholds.

9. The system of claim 1, wherein the updating of the portion of the output comprises changing a complexity of a graphical element of the graphical elements to a magnification scale of the portion of the output by discrete amounts relative to a hover distance from the surface of the interface display to the selector object.

10. A method, comprising:
    identifying, by a system comprising a processor, a defined change to a state of an interface display comprising determining that a number of graphical elements being displayed by the interface display exceeds a threshold number; and
    in response to the defined change being identified, modifying, by the system, the state of the interface display comprising updating a portion of an output of the interface display as a function of a position of a selector object interacting with the interface display with respect to a surface associated with the interface display.

11. The method of claim 10, wherein the identifying the defined change comprises determining that a magnification scale of a graphical element presented by the interface display satisfies a condition with respect to a defined magnification scale.

12. The method of claim 10, wherein the identifying the defined change comprises determining that a complexity of graphical elements presented by the interface display determined according to a defined complexity function with respect to the graphical elements satisfies a condition with respect to a defined complexity.

13. The method of claim 10, wherein the identifying the defined change comprises determining that a number of corrective changes to the output being displayed within a defined period of time satisfies a condition with respect to a threshold value.

14. The method of claim 10, wherein the updating of the portion of the output of the interface display comprises altering a magnification of the portion of the output as a function of a hover distance from the selector object to the surface in response to the selector object being determined to cross a set of tiered thresholds.

15. The method of claim 10, wherein the updating of the portion of the output comprises a change to a magnification scale of the portion of the output by discrete amounts relative to a distance from the surface of the interface display to the selector object.

16. The method of claim 10, wherein the updating is triggered by an operator preference comprising a preference to detect a presence of the selector object proximate to the interface display and a trajectory of the selector object proximate to the interface display.

17. The method of claim 10, further comprising:
    instantiating, by the system, a visual aid for the selector object to interact with the interface display,
    wherein the updating the portion comprises updating the portion of the output by altering the portion of the output of the interface display that comprises the visual aid.

18. The method of claim 17, wherein the visual aid comprises a highlighting of the portion of the output or a virtual magnifying glass over or proximate to the portion of the output.

19. A computer-readable storage device comprising executable instructions that, in response to execution, cause a system comprising a processor to perform operations, comprising:
    identifying a defined change to a state of a display, wherein the defined change is based on a determination of a number of graphical elements being displayed by the display satisfying a threshold condition; and
    updating a portion of an output of the display as a function of a position of a selector object interacting with the display with respect to a surface associated with the display, in response to the defined change being identified.

20. The computer-readable storage device of claim 19, wherein the operations further comprise:
    tracking the position of the selector object relative to the surface of the display in response to the defined change being identified; and
    altering another position of the output of the display, wherein the portion is determined by the position of the selector object,
    wherein the defined change further relates to a first number of corrections made to content presented by the display or a second number of corrections that have been undone being determined to exceed a predetermined number as the threshold condition.

* * * * *